United States Patent [19]

Davis et al.

[11] 4,147,859

[45] Apr. 3, 1979

[54] PROCESS FOR REMOVAL OF CHLOROFORM AND CARBON TETRACHLORIDE FROM CHLORINATED POLYVINYL CHLORIDE

[75] Inventors: Ronald J. Davis, Brecksville, Ohio; Thomas W. Boyer, Kincardine, Canada

[73] Assignee: The B. F. Goodrich Company, Akron, Ohio

[21] Appl. No.: 840,895

[22] Filed: Oct. 11, 1977

[51] Int. Cl.$^2$ ............................................. C08F 8/22
[52] U.S. Cl. .................................... 528/496; 526/17; 528/495; 528/497; 528/498
[58] Field of Search ................ 528/495, 496, 497, 498

[56] References Cited

U.S. PATENT DOCUMENTS

| | | | |
|---|---|---|---|
| 2,996,489 | 8/1961 | Dannis et al. | 526/45 |
| 3,100,762 | 8/1963 | Shockney | 526/45 |
| 3,167,535 | 1/1965 | Gateff et al. | 526/45 |
| 3,355,442 | 11/1967 | Taylor | 528/495 |
| 3,454,542 | 7/1969 | Cheape et al. | 528/500 |

*Primary Examiner*—Stanford M. Levin
*Attorney, Agent, or Firm*—J. Hughes Powell, Jr.; Alfred D. Lobo

[57] ABSTRACT

A process is disclosed for continuously stripping chloroform ($CHCl_3$) and carbon tetrachloride ($CCl_4$) contaminants from a slurry of agglomerated particles or macro-granules of chlorinated polyvinyl chloride (CPVC) utilizing a stripping agent chosen from a lower primary alcohol and a lower normally liquid alkane. In this process, the stripping agent has a peculiar affinity for each of these contaminants, does not dissolve or otherwise deleteriously affect the CPVC macro-granules, and efficiently reduces the level of the contaminants in the CPVC to less than 10 ppm each of $CHCl_3$ and $CCl_4$, based on solid resin.

12 Claims, 3 Drawing Figures

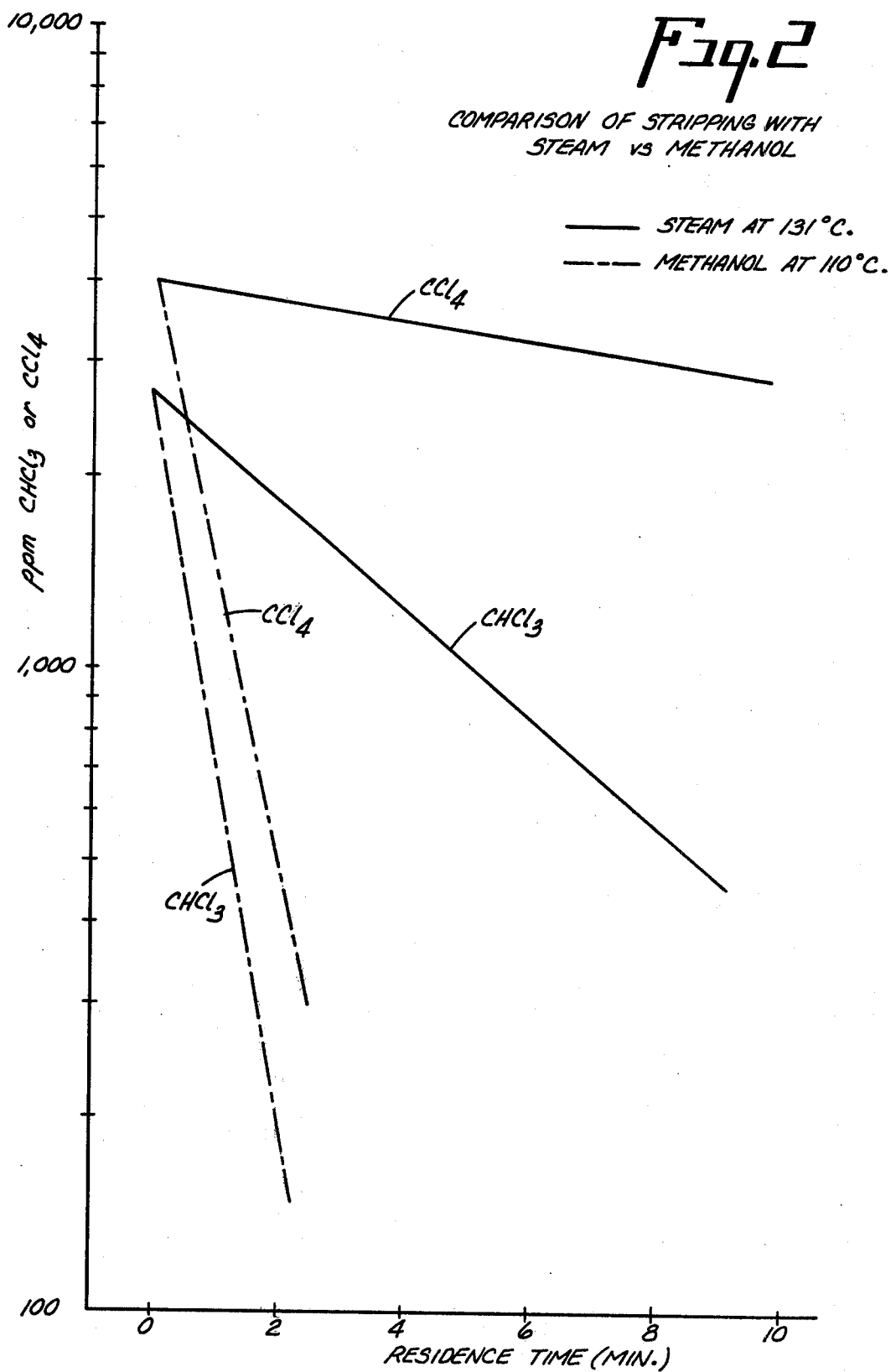

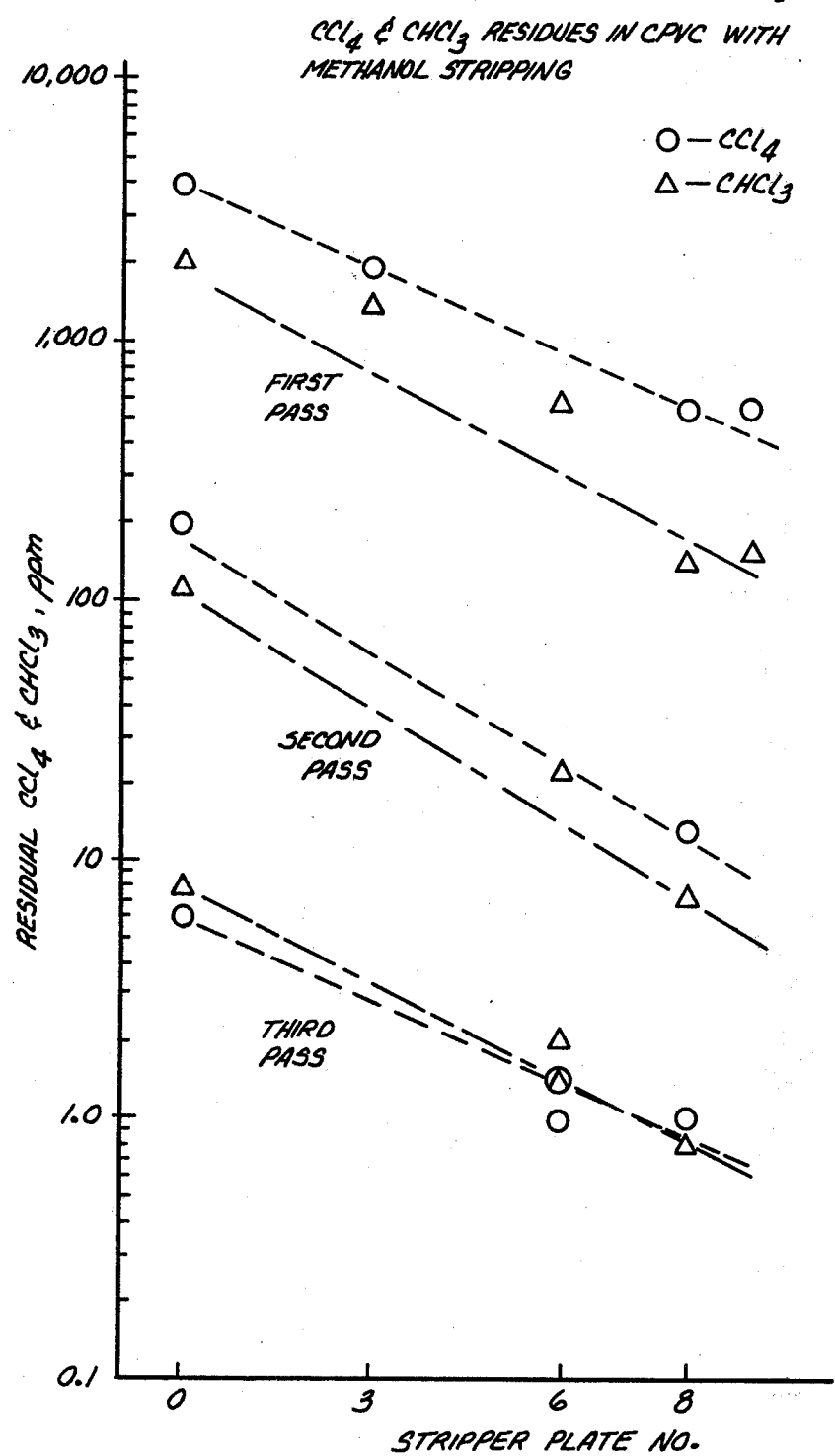

PROCESS FOR REMOVAL OF CHLOROFORM AND CARBON TETRACHLORIDE FROM CHLORINATED POLYVINYL CHLORIDE

BACKGROUND OF THE INVENTION

There has been an increased awareness of possible health hazards related to human ingestion of, or contact with suspect chemicals in polyvinyl chloride (PVC) and chlorinated polyvinyl chloride (CPVC). Much effort has been devoted to removing vinyl chloride from PVC. Much effort has also been devoted to removing hydro-chloromethylenes and carbon tetrachloride ($CCl_4$), very small quantities of each of which linger in CPVC even after determined steam stripping in a countercurrent continuous stripping column or "stripper".

Those skilled in the art are aware that the problem of stripping hydrochloromethylenes, such as dichloromethane and trichlormethane (chloroform, $CHCl_3$), and $CCl_4$ from CPVC are quite different from stripping vinyl chloride monomer from PVC. These chlorinated compounds are swelling agents which swell and wet macro-granular particles of PVC, hence are also referred to as swelling-wetting agents (hereafter "swelling agents" for brevity), which are used in a process for chlorinating PVC, to facilitate the substitution of chlorine in the PVC molecules. The term "macro-granular" refers to a granular resin in which essentially all of the particles are greater than about $10\mu$ (microns), and preferably a preponderant portion above about $50\mu$ in diameter.

The general size range of macrogranules is preferably from about $50\mu$ to about $500\mu$ in diameter, and typically is from about $100\mu$ to about $200\mu$ in diameter. Each macrogranule is made up of a multiplicity of primary particles in the size range from about $0.05\mu$ to about $5\mu$ in diameter, and more typically in the size range from about $0.5\mu$ (5000Å) to about $2\mu$ (20,000Å). The surface area of the CPVC polymer in this particle size range is from about 0.5 $m^2/g$ to about 80 $m^2/g$. The sizes and surface areas of the macrogranules, and those of the primary particles of which the macrogranules are constituted, are essentially the same whether the resin is PVC or CPVC. Also, like PVC primary particles, CPVC particles are porous. The porosity, or internal pore volume of suspension or mass-prepared CPVC is preferably in the range from about 0.05 cc/g to about 2 cc/g. Denser primary particles make stripping of the contaminants more difficult, as do larger primary particles, because the diffusion of the contaminants from within each particle to its surface controls stripping.

It will be evident that a more desirable solution to the problem of $CHCl_3$ and $CCl_4$ contaminants, is not to introduce either into the system in the first place. Recognizing that at present there is no viable alternative, these swelling agents are normally introduced into a high molecular weight PVC slurry after residual vinyl chloride monomer is stripped out. It is preferred to use only that amount of swelling agent as is necessary to effect the desired chlorination of PVC.

The process for preparing chlorinated polyvinyl chloride (CPVC) is set forth in more detail in U.S. Pat. Nos. 2,996,489; 3,100,762; and 3,167,535, the disclosures of which are incorporated by reference as if fully set forth herein. The CPVC is produced in a batch reaction in a chlorination reactor from which it is discharged as an acidic aqueous slurry containing from about 5 to about 25 percent by weight, based on solid resin, of $CHCl_3$ and $CCl_4$. Much, if not all of the $CCl_4$ is produced by chlorination of $CHCl_3$, one of the commonly used hydrochloromethylenes which are essential swelling agents. Typically however, some $CCl_4$ is added to the chlorination reactor in a relatively small amount compared to the amount of $CHCl_3$ added, the ratio by weight ranging from about 3 to about 50. The added $CCl_4$ referred to is byproduct $CCl_4$ carried over with recovery $CHCl_3$. Typically the ratio of $CHCl_3$ to byproduct $CCl_4$ added to the chlorination reactor is in the range from about 5 to about 10. After the chlorination reaction is completed, the amount of $CCl_4$ present is further enhanced due to chlorination of $CHCl_3$ to byproduct $CCl_4$. The amount of $CCl_4$ present is increased in the range from about 20% to about 50% by weight over the initial amount of $CCl_4$ introduced into the reactor.

This neutralized slurry is conventionally stripped with live steam in any suitable vessel such as a countercurrent stripping column, referred to as a primary steam stripper, which preferentially removes $CHCl_3$ though $CCl_4$ is also stripped. This primary stripping reduces the level of each contaminant, namely $CHCl_3$ and $CCl_4$, to less than about 5 percent by weight based on solid resin, and typically to less than 1.5 percent each by weight. Not unexpectedly, because of the manner in which the contaminants are combined or occluded within the porous primary CPVC particles in this low concentration, it is difficult to lower the contaminant concentration below about 1000 ppm even with a secondary steam stripper. Thus, despite additional, secondary steam stripping, commercially available CPVC typically contains well over 10 ppm each of $CHCl_3$ and $CCl_4$. For reasons not too clear at this time it appears that this difficulty is attributable to the presence of excess bound chlorine in essentially every primary particle. As used herein the term "excess chlorine" means chlorine in excess of that bound in the precursor by PVC.

Since $CHCl_3$ and $CCl_4$ are swelling agents which, under suitable conditions may be diffused out of CPVC, it would not seem too difficult, given enough time, to rid the CPVC of even traces of the contaminants utilizing a stripping agent such as steam which does not react with either the resin or the contaminants. But it is. It is difficult, time-consuming, and uneconomical, to strip essentially all $CHCl_3$ with live steam. It is even more difficult, and for practical purposes, impossible to strip essentially all the $CCl_4$ out of CPVC with live steam because the concentration of $CCl_4$ appears to level off at about 10 ppm, based on solid resin.

A practical commercial process dictates that the process be economical. An analysis of the characteristics of the process and its variables dictates that the process be continuous and countercurrent. But there is nothing to suggest the choice of particular stripping agents which have an unexpectedly high stripping effectiveness combined with desirable compatibility within the system. By compatibility we refer to the ability of the stripping agent to discharge its function of stripping effectively without deleteriously affecting the physical or chemical properties of the CPVC slurry or the resin itself. Stripping agents in which the CPVC resin is slightly soluble tend to transform the CPVC slurry into a coherent solid mass, or a thick paste. Hence it is essential that a "non-solvent" stripping agent be used, that is, one which does not have an adverse solvent effect on CPVC. Stripping agents with only a slight proclivity to react with either the resin or the contaminants impart, at the very least, an undesirable color to the resin, and often exacerbate the problem of purification. Stripping agents which are effective at temperatures in excess of about 150° C. are undesirable because the CPVC resin is sensitive to a temperature above about 150° C. It is essential that the CPVC be stripped without being degraded to any extent which is unfavorably reflected in its processing characteristics. Stripping without degradation of the CPVC is a more important requirement than the time in which stripping may be accomplished.

Within the framework of the foregoing strictures, it is also essential from an economic point of view, that the $CHCl_3$, $CCl_4$ and stripping agent be recoverable for reuse preferably separately, in relatively pure form. Thus one skilled in the art is likely to avoid the use of a stripping agent which forms an azeotrope with either one or the other swelling agent, or both. Surprisingly however, it has been found that the most preferred stripping agents, namely methanol and hexane are azeotrope formers. Methanol forms an azeotrope with $CHCl_3$ and $CCl_4$; hexane forms an azeotrope with $CHCl_3$.

SUMMARY OF THE INVENTION

It has been discovered that potentially harmful chlorinated hydrocarbons, used as swelling agents in the manufacture of chlorinated polyvinyl chloride (CPVC), can be substantially completely removed from this commonly used, commercial resin, at reasonable cost, using a stripping agent which is surprisingly effective compared with steam.

It has more particularly been discovered that a slurry of CPVC resin, essentially free of vinyl chloride monomer, may continuously be stripped of minor quantities of less than about 5 percent by weight, based on solid CPVC resin, of $CHCl_3$ and $CCl_4$ swelling agents in a countercurrent process utilizing a stripping agent selected from a lower primary alcohol and normally liquid alkane. By "normally liquid alkane" is meant an alkane which is liquid at ambient temperatures and atmospheric pressure.

It is therefore a general object of this invention to provide a continuous countercurrent process for efficiently and economically stripping $CHCl_3$ and $CCl_4$ swelling agents to a level less than about 10 ppm each, based on solid resin, in a countercurrent process utilizing a stripping agent selected from a lower primary alcohol and a normally liquid alkane.

It is a more specific object of this invention to provide a process utilizing a conventional stripper, operating at a temperature below about 150° C. and at a pressure below about 100 psig.

It is a still more specific object of this invention to provide a stripping process for low concentrations of $CHCl_3$ and $CCl_4$ utilizing either a lower primary alcohol or normally liquid alkane in a stripper having a liquid downflow rate as high as about 3000 lbs per hr per ft$^2$ of stripper cross-section, and a vapor upflow rate in excess of about 1000 lbs per hr per ft$^2$ of stripper cross-section, which nevertheless yields a bottoms product containing less than 10 ppm, and preferably less than 1 ppm of $CHCl_3$ and $CCl_4$ individually, on a solid basis.

Other objects and advantages of the invention will be apparent from the following description taken in conjunction with the drawings wherein:

BRIEF DESCRIPTION OF THE DRAWINGS

FIG. 2 is a graph plotted on semi-log paper indicating, for comparison, the rates of removal of $CCl_4$ and $CHCl_3$ from a CPVC slurry, using steam and methanol respectively, as stripping agents.

FIG. 3 is a graph plotted on semi-log paper indicating the rate of decrease of concentration of $CHCl_3$ and $CCl_4$ on successive sieve trays of a conventional countercurrent stripper under typical operating conditions for the process of this invention, using methanol (referred to hereinafter as "MeOH" for brevity) as the stripping agent. The flowsheet (FIG. 1) is for the preferred embodiment using MeOH.

DETAILED DESCRIPTION OF THE INVENTION

Figure 1:
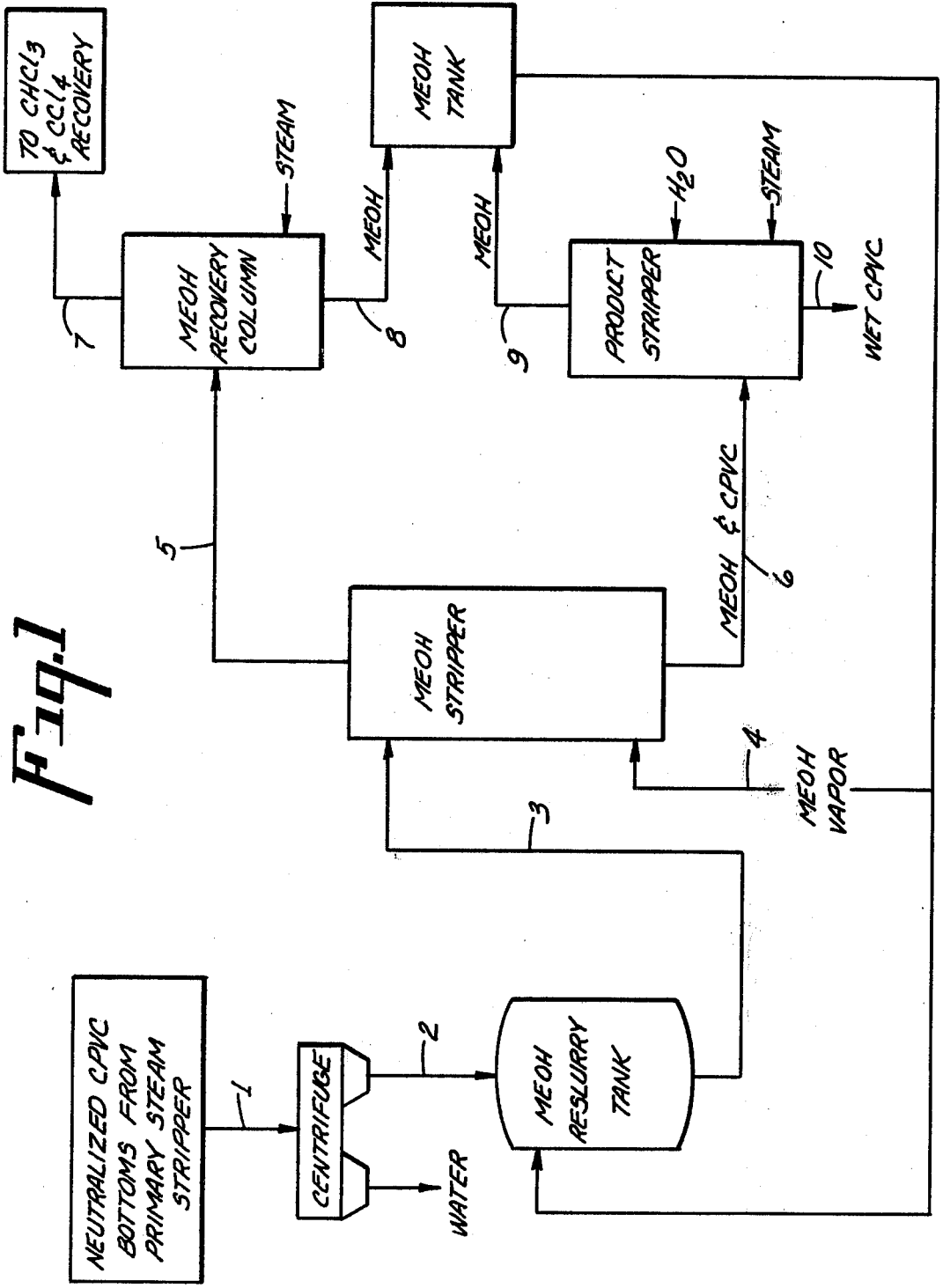
FIG. 1 is a flowsheet schematically illustrating the flow of CPVC neutralized wet cake from a centrifuge into a reslurry tank in which a nonsolvent stripping agent is added, and the CPVC, reslurried in a stripping agent, is flowed to a stripper where $CHCl_3$ and $CCl_4$ swelling agents are stripped from the CPVC.

As has already been stated, this invention is especially concerned with chlorinated polyvinyl chloride (CPVC) wet cake as it is dropped from a centrifuge into a reslurry tank*shown on the flowsheet, illustrated schematically in FIG. 1. The wet cake is contaminated with $CHCl_3$ and $CCl_4$ swelling agents, a substantial portion of which is occluded within or otherwise held by swollen primary particles in macrogranules of CPVC. The size of the macrogranules is not of particular importance but larger primary particles, greater than about $2\mu$ in diameter, require a longer time for stripping, presumably because of the longer diffusion path for molecules of contaminants. Even with smaller particles, less than about $1\mu$ in diameter, the diffusion path is long enough that the mechanism of diffusion controls the stripping process, rather than vapor-liquid equilibria considerations. Because of the rate of diffusion being controlling, and diffusion under stripping conditions being a highly complex, unsteady state phenomenon, there is no known way to predict the operability, much less the efficacy of a non-solvent stripping process such as the one described herein

*identified in FIG. 1 as "MeOH reslurry tank".

The CPVC solids obtained are contaminated with $CHCl_3$ and $CCl_4$, which together are present in the range from about 0.01% to about 2% by weight, on a solids basis, and preferably less than 1% by weight. The ratio of $CHCl_3$ to $CCl_4$ present is not critical, and typically because of the relative ease with which $CHCl_3$ is stripped from CPVC by live steam in a preceding step describing hereinbefore, the $CCl_4$ is present in an amount greater than about 50% by weight of the mixture of $CHCl_3$ and $CCl_4$.

The reslurry holding tank functions as a mixing tank in which wet cake is dispersed in the stripping agent selected from the group consisting of a lower primary alcohol having one (1) to about seven (7) carbon atoms, and a normally liquid alkane having from about five (5) to about nine (9) carbon atoms. The reslurry tank also functions as a surge from which slurry is continuously fed to the stripper.* The reslurry tank is provided with an agitator to keep the CPVC solids from settling out. In addition, the reslurry tank may be provided with conventional heat exchange means, such as one or more bayonet-type heat exchangers, to preheat the slurry to a predetermined temperature, and the tank is suitably insulated. Preheated slurry from the reslurry tank is pumped to the stripper, near its top, to be stripped *identified in FIG. 1 as "MeOH stripper".

The presence of residual saline water in the CPVC is mimimized by centrifuging the neutralized slurry. However, it is not essential that the amount of residual saline water be minimized. The effectiveness of the stripping agents does not appear to be negated even when a relatively large amount of residual water, up to about 50% by weight, is present. It will be apparent however that any excess residual water in the CPVC is carried into the successive steps of the process, makes additional demands on the heat duty of the stripper, complicates the vapor-liquid equilibria and diffusion of the contaminants in the system, and places a further economic burden to recover and separate the residual water from the contaminants and the stripping agent. It is preferable therefore, from the standpoint of good chemical engineering practice, to minimize the presence of residual water by centrifuging.

The stripper may be of any conventional design wherein liquid to be stripped is flowed downwardly from near the top, and it is provided with means for introducing additional stripping agent in the vapor phase into the stripper, near its bottom. The internals of the stripper are chosen for low pressure drop, clog-resistant operation, reliably uniform flow and ease of cleaning. Though a packed column, such as a stripper packed with Berl saddles, Raschig rings or other flow distribution means, will operate satisfactorily when first brought on stream, those skilled in the art will recognize that a stripper with trays is more suitable for long-term operation. Though trays of various designs such as bubble cap trays, valve type trays and the like will function, it is preferred to use sieve trays.

The operating conditions of the stripper are chosen so that the maximum temperature within the stripper, near the bottom, approaches the highest temperature the CPVC solids can acceptably endure without being deleteriously affected. Higher temperatures improve the rate of stripping, but the temperature should not exceed about 150° C., though this upper limit will vary depending upon the amount of excess chlorine introduced into the resin particles. A preferred range of operating temperature is in the range from about 100° C. to about 140° C. depending upon the operating pressure, and the temperature differential ($\Delta T$) is less than about 10° C. between the top and bottom of the stripper. The operating pressure of the stripper is determined by vapor-liquid equilibria under the temperature conditions chosen. Typically the average operating pressure of the stripper is in the range from about atmospheric to about 50 psig, and the pressure differential ($\Delta P$) from top to bottom is about 10 psig, depending upon the number of trays used and the tray loadings.

The rate of flow of CPVC slurry-feed to a stripper provided with a predetermined number of trays to effect the desired stripping, depends on numerous process design considerations. Chief among these are the initial concentration of $CHCl_3$ and $CCl_4$ in the slurry-feed and their relative concentrations, the solids content, the maximum amount of stripping agent that may be introduced as vapor into the stripper, and the desired final concentration of $CHCl_3$ and $CCl_4$ in the stripped CPVC solids. Where the initial concentration of $CHCl_3$ and $CCl_4$ together in the feed is about 2.5% by weight, on a solid basis the ratio of $CHCl_3:CCl_4$ is about 1, and the final concentration of $CHCl_3$ and $CCl_4$ together in the CPVC solids is to be less than 20 ppm, then the flow rate of slurry-feed to the stripper may be as high as 2000 lb per hr per ft$^2$ of stripper cross-sectional area, if the flow rate of stripping agent vapor is at least, on average, about 1200 lbs per hr per ft$^2$ of cross-sectional area, at an average temperature of about 110° C. Where the final concentration of $CHCl_3$ and $CCl_4$ together in the stripped CPVC solids is to be less than 1 ppm, on a solid basis, the flow rate of slurry-feed to the stripper may be as high as about 1500 lbs per hr per ft$^2$ of cross-sectional area.

With a typical CPVC slurry-feed contaminated with from about 0.1 to about 1.5 percent by weight, on a solids basis, of each $CHCl_3$ and $CCl_4$ swelling agents, it is desirable to utilize at least 8 sieve trays, or 7 theoretical plates where a packed column is used, to yield CPVC solids contaminated with less than 10 ppm, at economically acceptable flow rates. Those skilled in the art will recognize that a slurry-feed having a low concentration of contaminants and residual water, and using a high rate of flow of stripping agent will require relatively fewer trays than a slurry-feed having a high concentration and using a low rate. It is most preferred to utilize as large a number of sieve trays as is consistent with good design practice, to get maximum flow rates and maximum stripping, at lowest cost.

The contaminants $CHCl_3$ and $CCl_4$ stripped from the CPVC, together with the stripping agent and steam which is incidentally generated by vaporization of residual water, are removed overhead from the stripper (referred to as the "MeOH stripper" for the purpose of this preferred embodiment). Since the MeOH stripping agent is desirably also recycled, the overhead vapors are ducted to a MeOH recovery column of conventional design. Recovery and separation of the MeOH, or other stripping agent, and contaminants are within the skill of a chemical engineer and incidental to the process of this invention. As shown in the flowsheet, FIG. 1, the overhead is flowed to a MeOH recovery column where the contaminants are recovered overhead. MeOH stripping agent is taken as MeOH recovery column bottoms which is flowed to a MeOH tank. From the MeOH tank the MeOH is recycled to the process. The MeOH tank is a surge tank different from the MeOH reslurry tank.

The MeOH stripper bottoms is a slurry of MeOH and stripped CPVC solids containing a desired tolerable level, less than 10 ppm based on solid resin, of each $CHCl_3$ and $CCl_4$, and traces of water and sodium chloride. Typically less than 0.1% by weight of the bottoms stream, is water and sodium chloride. This bottoms stream from the MeOH stripper is flowed to a product stripper where methanol is removed overhead and flowed to the methanol tank. A thick slurry of CPVC in water is removed from the bottom of the product stripper. This CPVC slurry is conventionally centrifuged and dried to yield powder CPVC.

As related hereinbefore, only a stripping agent chosen from a lower primary alcohol having from 1 to about 7 carbon atoms, and a normally liquid alkane having from about 5 to about 9 carbon atoms, is effective. By a normally liquid alkane I particularly refer to a normal or straight-chain alkane, such as heptane, a branched chain alkane such as 2-methyl-heptane, or a cycloalkane such as cycloheptane, each of which is liquid at atmospheric pressure (about 760 mm Hg) and room temperature (about 20° C.). Most preferred among the alkanes are heptane and octane, and mixtures thereof. Though the lower primary alcohols are prone to form azeotropes with the $CHCl_3$ and $CCl_4$, and also sometimes with water, they are preferred. Most preferred are methanol, ethanol, propanol, isopropanol, butanol and isobutyl alcohol, or mixtures thereof. Not only are these specific stripping agents non-solvents for CPVC but they exhibit a peculiar affinity for $CHCl_3$ and $CCl_4$. At the same time these stripping agents meet commercial criteria, including not adversely affecting the processing characteristics of the resin. Stated differently, one might say, despite the affinity of $CHCl_3$ and $CCl_4$ for CPVC, which makes them desirable swelling agents, it is surprising and fortuitous that two categories of compounds namely lower primary alcohols and normally liquid alkanes, are effective stripping agents. These stripping agents display a most helpful affinity for $CHCl_3$ and $CCl_4$. This unique affinity presumably accounts for diffusion of the contaminants out of the CPVC primary particles and into the liquid or vapor phase of the stripping agent.

Since it is the stripping agent (MeOH, say) that strips the contaminants from the CPVC, it is essential that there be upward flow of MeOH vapor in the MeOH stripper. Therefore it is essential that MeOH vapor be injected into the stripper. It is not essential that liquid MeOH be introduced with the slurry-feed. It is preferable, however, to do so to obtain a pumpable slurry-feed to the tower, and it is economically expedient to reslurry centrifuged wet cake with MeOH, rather than water. It will be recognized that about 25% by weight of the centrifuged CPVC wet cake is water which will not be centrifuged away. The presence of this residual water does nothing to decrease costs, nor does it appear to improve the removal rate of the contaminants. It will be apparent that to add water to obtain a pumpable slurry, rather than MeOH, is contraindicated. It would be more advantageous to add the unpumpable centrifuged wet cake to the MeOH stripper, if an expedient method of doing so can be devised.

Referring now to FIG. 2 there is shown, for comparison, curves for stripping with steam and methanol, plotted on semi-log paper, comparing the rates of removal of $CCl_4$ and $CHCl_3$ from a CPVC slurry as a function of residence time in a countercurrent stripper. CPVC slurry was previously neutralized and subjected to an initial stripping with steam in a primary steam stripper. As has been stated hereinabove this neutralization and initial stripping is not shown on the flowsheet (FIG. 1). These operations are presently practiced to reduce the level of contaminants to as low a level as is practicable. Typically, $CHCl_3$ and $CCl_4$ are each present in a concentration below about 2% by weight based on solid resin, and more preferably less than about 1% by weight. Though it is desirable that a CPVC slurry to be decontaminated by the process of this invention, contain a relatively low concentration of contaminants, it will now be evident that the initial steam stripping need not reduce contaminants to the less than 2% by weight level. Data points for the curves shown were obtained with wet CPVC, which was fluid enough to be pumped. The curves for stripping with methanol show rates of removal of $CHCl_3$ and $CCl_4$ contaminants in the presence of some residual water which was not removed from centrifuged CPVC before it was reslurried in methanol.

As will be seen from FIG. 2 the removal curve for $CCl_4$ with steam is relatively flat compared with the removal curve for $CHCl_3$ with steam, particularly when each contaminant is present in an amount in the range from about 1000 ppm to about 10,000 ppm based on solid resin. Stripping with steam is slow for both, though $CHCl_3$ is stripped faster than $CCl_4$. Though it is not documented on the curves of FIG. 2 because residence times were impractically low, it has been found that when the concentration of each contaminant is reduced to about 100 ppm, there is no significant removal of $CCl_4$ from one plate to the next lower plate. Below the 100 ppm level there is continued removal of $CHCl_3$ but at a slower rate. Regardless of the level of relative contaminant concentration, it appears that steam has a greater affinity for $CHCl_3$ than $CCl_4$.

Referring further to FIG. 2 and more particularly to the removal curves for $CHCl_3$ and $CCl_4$ using methanol (MeOH) to strip the wet CPVC slurry, it is seen that the rate of removal of each contaminant with MeOH is about the same, where the initial concentration of each is about 1% by weight based on solid resin. Quite unexpectedly MeOH displays about the same affinity for $CCl_4$ as it has for $CHCl_3$, permitting efficient stripping of both contaminants at comparable rates. Still more unexpectedly, when the concentration of each contaminant has been reduced to about 10 ppm, the desired acceptable concentration in the CPVC, it appears that the rate of removal of $CCl_4$ overtakes the rate of removal of $CHCl_3$.*

*not apparent from FIG. 2, but in FIG. 3.

Thus, utilizing steam, difficulty removable $CCl_4$ displays a flattened removal curve below about 10 ppm; but using MeOH, $CCl_4$ is about as readily removed as $CHCl_3$ down to about 10 ppm concentration of each, and then, $CCl_4$ is more easily removed than $CHCl_3$. It is this serendipitous discovery of the behavior of MeOH in a wet CPVC system that makes it most desirable. Other stripping agents among the lower primary alcohols and the normally liquid alkanes have not been tested sufficiently to furnish data as to their behavior below the 10 ppm concentration level of contaminants. However, each stripping agent exhibits a characteristic noticeably nearly equal affinity for each contaminant at below about 1% by weight, relative to the affinity of steam under analogous circumstances.

Referring now to FIG. 3 there is plotted data points for the concentrations of $CHCl_3$ (marked with triangles) and $CCl_4$ (marked with circles) for a particular experimental run simulating a stripper having 24 sieve trays, and the stripping agent is MeOH. The comparable rates of removal for $CHCl_3$ and $CCl_4$ are easily seen as is the favorable "break" of the removal curve for $CCl_4$ below the 10ppm concentration level. Further details are set forth in Example 1 hereinbelow. All references to percent (%) and parts per million (ppm) refer to parts by weight unless otherwise specifically stated.

EXAMPLE 1

DESCRIPTION OF THE EQUIPMENT

A 6"(inch) diameter (dia) pressure column is fitted as a stripper with 8 sieve trays spaced 9.5" apart. Each tray is provided with 26 holes, each 0.25" in dia, and a 1" riser which extends 1.5" above the upper surface of the tray. A downcomer extends downwardly from the tray above to within 0.6" of the plate below, so that there is a cross-flow of liquid across each tray. The stripper is provided with the usual accessories for its operation in this pilot plant run.

MeOH vapor is introduced into the stripper 14" below the bottom plate. Below the bottom plate the diameter of the stripper is reduced to 4" to accomodate two 4" dia × 7" long glass tubes which function as sight glasses for observing the stripper bottoms during operation. Additional sight glasses are installed between each tray to assist in setting column operating conditions, and to detect the presence or onset of flooding or weeping conditions.

The volume of stripped slurry at the bottom of the column is maintained constant by means of a level controller located between the glass tubes forming the bottom portion of the stripper. This volume was one liter. The level controller actuated a pneumatic piston which opened and closed a discharge valve in the bottom.

Slurry-feed to the stripper is supplied from a heated, pressurized, 15-gallon, stirred autoclave. The slurry is circulated through a 1" stainless steel loop from the autoclave to the top of the column and back through a valve to the autoclave. Near the top of the column, feed is obtained by pneumatically actuating a Strahman valve with a timer. This timer precisely controlled the frequency and duration of feed from the circulating loop into the stripper.

Overhead vapor is removed through a valve to a condenser and then to a receiver. Pressure and temperature taps are located immediately below the bottom plate. Sampling taps are located at the circulating pump for the feed, at plates 3, 6 and 8 (the bottom plate), and at the discharge valve.

OPERATION OF THE STRIPPER

Before the CPVC slurry feed was started to the column, the column was heated by the stripping vapor until a steady state condition was reached. The amount of condensate within the column itself was measured over a timed interval at steady state, and assumed to remain at this level throughout the run. The amount of condensate taken overhead was measured over a timed interval at steady state and assumed to remain constant throughout the run. This is the "G" rate used to calculate the L/G ratio.

Then the feed was started to the column. The circulating feed was at the same temperature as the column. The feed rate was adjusted to approximate the desired L/G ratio and a new steady state achieved and held for the duration of the run.

After a steady running condition was reached, a series of five samples was taken from the sample stations listed above. These samples were submitted for work-up and analyses.

The operating conditions were not ideal because of the intermittent nature of the feed. This feed system was necessitated because the suspended solids in the slurry feed tended to settle rapidly once agitation was stopped. Each slug would obviously upset the column down to the third or fourth tray. On a large scale with steady flow rates to and from the column, the operation should be smoother and the separations even better than we obtained.

To simulate a 24 tray stripper, three runs were made in tandem, that is, the bottoms product from the first run was the slurry-feed for the second run, and bottoms product from the second run was the slurry-feed for the third. Five samples were obtained for each run and these concentration data are plotted as a function of the tray on which they were found. The stripper was operated at about 100° C. and about 33 psig. As stripping efficiency generally increases at higher temperatures it is desirable to operate the stripper at as high a temperature as the CPVC can reasonably endure without degradation. Of course subatmospheric pressures may be used at relatively low temperatures and superatmospheric pressures at relatively high temperatures, but the upper limit of operating pressure is set by the choice of operating temperature, and is consistent therewith. Pressures in excess of 100 psig may be warranted if the CPVC resin can endure the corresponding temperature.

Data for the run using a slurry-feed having a 25% solids content and containing about 4000 ppm $CCl_4$ and about 2000 ppm $CHCl_3$, are set forth in Table I hereinbelow. The average operating pressure of the stripper was 33.7 psig, the average operating temperature 111.33° C. and the average residence time of the slurry on each plate was 15.2 secs. Decontaminated CPVC has a density in the range from about 1.43 to about 1.65 at 25° C., and preferably from about 1.55 to about 1.58.

Referring now to FIG. 3, there is plotted on a logarithmic scale, the concentration of residual $CCl_4$ (circles) and $CHCl_3$ (triangles) against the plate number at which samples were taken. From the data labeled "First Pass" it is seen the rate of removal of $CHCl_3$ and $CCl_4$ is nearly the same. The curves for the "Second Pass" are nearly parallel to those of the first pass. But the curves for the "Third Pass" intersect, indicating the rate of removel of $CCl_4$ overtakes that of $CHCl_3$ below the 10 ppm concentration level.

Table I

|  | Flow Rates, lb/hr MeOH | | | Concentration of Contaminants in bottoms | |
|---|---|---|---|---|---|
|  | Vapor "G" | Slurry "L" | L/G | $CCl_4$ ppm | $CHCl_3$ ppm |
| First Pass | 52 | 202 | 3.88 | 548 | 152 |
| Second Pass | 54 | 194 | 3.59 | 22 | 20 |
| Third Pass | 56 | 191 | 3.41 | 3 | 1.5 |

EXAMPLE 2

The following description applies to a typical production run wherein a neutralized CPVC bottoms stream from a primary steam stripper contains about 17.6% by weight of CPVC. As seen on the flowsheet (FIG. 1) this stream, identified by reference numeral 1, is centrifuged and a wet cake, identified by reference numeral 2, containing about 70% CPVC and a negligible amount of sodium chloride in solution, is dropped into a MeOH reslurry tank. The concentration of $CHCl_3$ is about 1.5%, and of $CCl_4$ about 0.35%, based on CPVC. Sufficient MeOH is added to provide an easily pumpable slurry-feed identified by reference numeral 3, containing about 33% by weight solid CPVC. This slurry-feed 3 is flowed continuously into a MeOH stripper having 24 sieve trays, near its top. A gaseous MeOH stream, identified by reference numeral 4 is introduced into the MeOH stripper near its bottom. The amount of vapor introduced is about 80% by weight of the MeOH introduced in the slurry-feed.

When the stripper is operated at about 110° C. and about 30 psig, about 25% of all the MeOH entering the stripper is taken in the overhead stream, identified by reference numeral 5. This stream 5 contains essentially all the $CHCl_3$ and $CCl_4$ contaminants introduced with the slurry-feed. The bottoms, identified by reference numeral 6, from the MeOH stripper, is a pumpable slurry containing about 27% CPVC and less than 10 ppm of either $CHCl_3$ or $CCl_4$.

With the data set forth in FIGS. 2 and 3 one skilled in the art may routinely design a MeOH stripper to provide a bottoms product having a predetermined concentration of either $CHCl_3$ or $CCl_4$, each being as low as 1 ppm or even less. A typical run has a liquid downflow rate of about 2000 lbs per hr per $ft^2$, and a vapor upflow rate of about 1000 lbs per hr $ft^2$ of stripper cross-section.

The overhead 5 is condensed and flowed to a MeOH recovery column in which $CHCl_3$ and $CCl_4$ are stripped from the MeOH by steam. The $CHCl_3$ and $CCl_4$ are taken in an overhead stream identified by reference numeral 7, to a recovery system, from which they are recycled for use in the process. The bottoms stream, identified by reference numeral 8, is essentially MeOH containing less than 5% water, which stream 8 is flowed to a MeOH tank.

The bottoms stream 6, from the MeOH stripper, consists essentially of CPVC in MeOH containing about 0.375% water and a comparably small amount of NaCl, based on CPVC resin. This stream 6 is flowed to a product stripper where MeOH is stripped from product CPVC with steam. The overhead stream, identified by reference numeral 9, contains about 0.1% water and is flowed to the MeOH tank. The bottoms stream, identified by reference numeral 10, is a pumpable CPVC containing about 25% solids and contaminated with less than 0.4% NaCl. This stream 10 is conventionally centrifuged and dried to yield a powder CPVC resin product which is contaminated with less than 10 ppm of either $CHCl_3$ or $CCl_4$.

Those skilled in the art will recognize that the MeOH Recovery Column is preferably operated under conditions such that stripping steam injected into the column (as shown in FIG. 1), is removed overhead with contaminants $CHCl_3$ and $CCl_4$; and, that the Product Stripper is desirably operated under conditions such that MeOH is taken overhead. Stripping steam, and optionally additional water, is introduced into the product stripper as shown in the flowsheet, and most of the condensed steam leaves with the wet CPVC bottoms stream 10.

We claim:

1. A process for stripping minor quantities, less than about 5 percent by weight based on solid resin, of hydrochloromethylene and carbon tetrachloride contaminants in the presence of residual water from solid, contaminated chlorinated polyvinyl chloride resin essentially free of vinyl chloride monomer, comprising the steps of (i) continuously flowing said resin contaminated with each of said contaminants downwardly through a stripping column or stripper at a temperature below that which is deleterious to said resin; (ii) injecting a stripping agent, selected from the group consisting of a lower primary alcohol having from 1 to about 7 carbon atoms, and a normally liquid alkane having from about 5 to about 9 carbon atoms, in the vapor phase to flow upwardly in said stripper, countercurrent to said resin and in contact therewith to strip said contaminants from said resin; (iii) removing substantially all of said contaminants and a portion of said stripping agent from overhead said stripper; and, (iv) recovering from said stripper essentially contaminant-free resin contaminated with less than 10 ppm each, based on solid resin, of said hydrochloromethylene and carbon tetrachloride.

2. The process of claim 1 wherein said lower primary alcohol is selected from methanol, ethanol and propanol, and said normally liquid alkane is selected from hexane, heptane and octane.

3. The process of claim 2 wherein said hydrochloromethylene and carbon tetrachloride are each present in said contaminated CPVC resin in an amount less than about 5 percent by weight based on solid resin.

4. The process of claim 3 wherein said contact occurs over at least 7 theoretical stages.

5. The process of claim 4 wherein said contact occurs over multiple actual stages in the range from about 8 to about 30.

6. The process of claim 5 wherein said essentially contaminant-free resin is contaminated with less than 1 ppm, based on solid resin, of each said hydrochloromethylene and carbon tetrachloride.

7. The process of claim 5 wherein pressure is in the range from subatmospheric to superatmospheric consistent with said temperature at which said stripper is operated.

8. The process of claim 7 wherein said hydrochloromethylene is trichloromethane.

9. The process of claim 8 wherein chloroform and said carbon tetrachloride are each present in said contaminated resin in an amount in the range from about 0.1 percent to about 2 percent by weight, based on solid resin.

10. The process of claim 9 wherein said lower primary alcohol is methanol.

11. The process of claim 9 including recovering said stripping agent for reuse in said stripper.

12. The process of claim 9 including recovering said hydrochloromethylene and said carbon tetrachloride for reuse.

* * * * *